United States Patent [19]

Farrow et al.

[11] 4,199,856
[45] Apr. 29, 1980

[54] METHOD OF PROVIDING LUBRICANT VOLUME DISPLACEMENT SYSTEM FOR A ROTARY ROCK BIT

[75] Inventors: James T. Farrow, Grand Prairie; William D. Vanderford; Ernest E. Taylor, both of Irving, all of Tex.

[73] Assignee: Dresser Industries, Inc., Dallas, Tex.

[21] Appl. No.: 929,613

[22] Filed: Jul. 31, 1978

[51] Int. Cl.² .............................................. B23P 19/04
[52] U.S. Cl. .................................... 29/454; 29/460; 141/1; 175/228; 308/187; 308/8.2; 184/6.14
[58] Field of Search ................. 29/454, 460; 175/228; 184/6.14, 45 R; 141/1, 7; 137/15; 308/187, 8.2

[56] References Cited

U.S. PATENT DOCUMENTS

| | | | |
|---|---|---|---|
| 3,007,751 | 11/1961 | Eenink | 308/187 |
| 3,917,028 | 11/1975 | Garner | 184/6.14 |
| 4,014,595 | 3/1977 | Dalezal | 175/228 X |
| 4,055,225 | 10/1977 | Millsapps | 175/228 |
| 4,073,548 | 2/1978 | Walters | 175/288 X |

FOREIGN PATENT DOCUMENTS 1310634 10/1962 France ........................ 175/227

*Primary Examiner*—Charlie T. Moon
*Attorney, Agent, or Firm*—Eddie E. Scott

[57] ABSTRACT

A rotary rock bit is provided having a lubrication system with an expansion space within the lubricant reservoir to accommodate changes in lubricant volume. A flexible diaphragm is located within the lubricant reservoir. The lubricant reservoir is filled with lubricant thereby moving the flexible diaphragm to a substantially completely filled position. A predetermined volume of lubricant is displaced from the lubricant reservoir by forcing a fluid through passage means in the reservoir cap, moving the flexible diaphragm and displacing a predetermined volume of lubricant thereby providing an expansion space within the lubricant reservoir.

5 Claims, 5 Drawing Figures

4,199,856

METHOD OF PROVIDING LUBRICANT VOLUME DISPLACEMENT SYSTEM FOR A ROTARY ROCK BIT

TECHNICAL FIELD

The present invention relates in general to the art of earth boring and more particularly to a system for equalizing pressures in the lubrication system of a rotary rock bit.

BACKGROUND OF THE INVENTION

Problems have been encountered with prior art systems of supplying lubricant to the bearings of a rotary rock bit because of the relatively long lifetime of modern bits and the wide variation of environmental conditions encountered during an oil well drilling operation. When a rotary rock bit is lowered into a well bore, the environmental pressure surrounding the bit increases at the rate of approximately ½ pound per square inch for each foot of depth. This means that at a depth of 10,000 feet the hydrostatic pressure on the outside of the bit could be 5,000 p.s.i. or more because of the weight of the drilling fluid in the well bore above the bit. In order for a lubrication system to function properly at the elevated downhole pressures, some means must be provided to equalize the internal pressure of the lubricant in the lubrication system with the hydrostatic pressure of the drilling field in the well bore. Failure to provide an effective pressure equalizing system in prior art rock bits has resulted in the destruction of one or more elements of the lubrication system. The elements of the lubrication system that have been the most susceptible to destruction in the prior art bits are the seal and the flexible diaphragm in the lubricant reservoir.

A wide variety of other environmental conditions also affects the performance of a pressure equalizing system. For example, the temperature will rise as the well bore penetrates deeper into the earth and temperatures in the range of 250° to 350° at 10,000 feet depth may be expected with even high temperatures at greater depths. As the bit is rotated and the cone cutters engage the formations, a large amount of heat is generated causing the environmental temperature of the bit to rise. The elevated temperature has an adverse effect on the lubricant, the structural elements of the bit including the lubrication system, the pressure equalizing system and the bearings.

Vacillating pressure conditions, including the magnitude of vacillation, must also be considered when providing a pressure equalizing system. Periodic pressure variations are produced during the drilling operation and these pressure variations can damage the structural elements of the lubrication system and the pressure equalizing system. During drilling, joints of pipe must be added to the drill string for progressively deeper penetration. This may mean that 50 or 60 joints of pipe are added to the drill string during the normal life of a sealed bearing rotary rock bit. In order to add a joint of pipe, which is usually 30 feet in length, rotation of the bit must be stopped and the entire string of pipe, including the bit, must be raised high enough to allow the kelly to clear the rotary table (35-50 feet). Since operating costs of an oil well drilling rig are quite high, the time that the bit is off bottom and not drilling must be kept to a minimum. Therefore, the addition of a joint of pipe is usually accomplished quickly and the drill string is raised and lowered as rapidly as possible. This raising and lowering of the drill string creates pressure variations that affect the lubrication system and the pressure equalizing system.

When the bit is on bottom, the pressure of lubricant is the same as, or nearly the same as, the hydrostatic pressure of fluid in the well bore. However, as the drill string is elevated in the well bore, the bit body acts in much the same manner as a piston in a cylinder. The enlarged diameter of the bit body exerts a force on the column of fluid above it due to the velocity of the bit traveling up the well bore. The velocity of the fluid moving past the large diameter portion of the bit may be fairly high causing a low pressure area in the zone between the cutters and the main bit body where the seal is located. The pressure differential between the pressure of fluid in the area of the seal and the pressure of the lubricant inside of the bit may be in the order of 100 p.s.i. or more during periods of high acceleration of the drill string.

In a substantial number of sealed bearing rotary rock bits, seals are used that resist flow in both directions. An example of this type of seal is an O-ring seal. Bits using this type of seal may encounter a substantial pressure buildup within the lubrication system. Some of the potential sources of the pressure build-up are the pressure differential between lubricant inside of the bit and the fluid in the well bore outside of the bit and thermal expansion of the lubricant caused by the elevated temperatures encountered during the drilling operation.

DESCRIPTION OF PRIOR ART

Many different systems have been employed (or described in printed publications) to compensate for pressure variations acting on the lubricant within the lubrication system of a rotary rock bit. A movable piston has been shown as being positioned in the lubricant reservoir and the area above the piston vented to the exterior of the bit to expose the upper side of the piston to the environmental pressure of the well bore. A relief check valve has been provided to operate at low pressures to permit flow out of the lubricant reservoir to the outside of the bit but block any flow in the reverse direction. A lubricant reservoir has been described as having a permanent closure plug removably mounted within the entrance to the reservoir and a temporary closure plug removably mounted within the entrance to the reservoir in place of the permanent plug when the reservoir is filled with lubricant whereby when so filled and the permanent plug mounted in place of the temporary plug, an expansion space is provided between the lubricant in the reservoir and the inner side of the permanent plug. A free breathing porous filter plug has been positioned in a passageway for equalizing the internal pressure of lubricant in the lubricant reservoir and the hydrostatic pressure of drilling fluid in the well bore. Pressure compensation or equalization of pressure across a seal separating the lubricant inside the bit from the drilling mud on the exterior of the bit has been described as being obtained by providing sufficient displacement of the seal to accommodate changes in lubricant volume caused by temperature and pressure changes encountered in drilling.

SUMMARY OF THE INVENTION

The present invention provides an expansion space within the lubrication system of a rotary rock bit to accommodate changes in lubricant volume. A flexible diaphragm is located in the lubricant reservoir of the bit. The lubricant reservoir is filled with lubricant thereby moving the flexible diaphragm to a substantially completely filled position. A fluid is forced through passage means leading to the lubricant reservoir thereby moving said flexible diaphragm to a partially filled position and displacing a volume of lubricant thereby providing an expansion space in the bit to accommodate any changes of volume in the lubricant during the drilling operation. The above and other features and advantages will become apparent from a consideration of the following detailed description of the invention when taken in conjunction with the accompanying drawings.

DETAILED DESCRIPTION OF THE INVENTION

Figure 1:
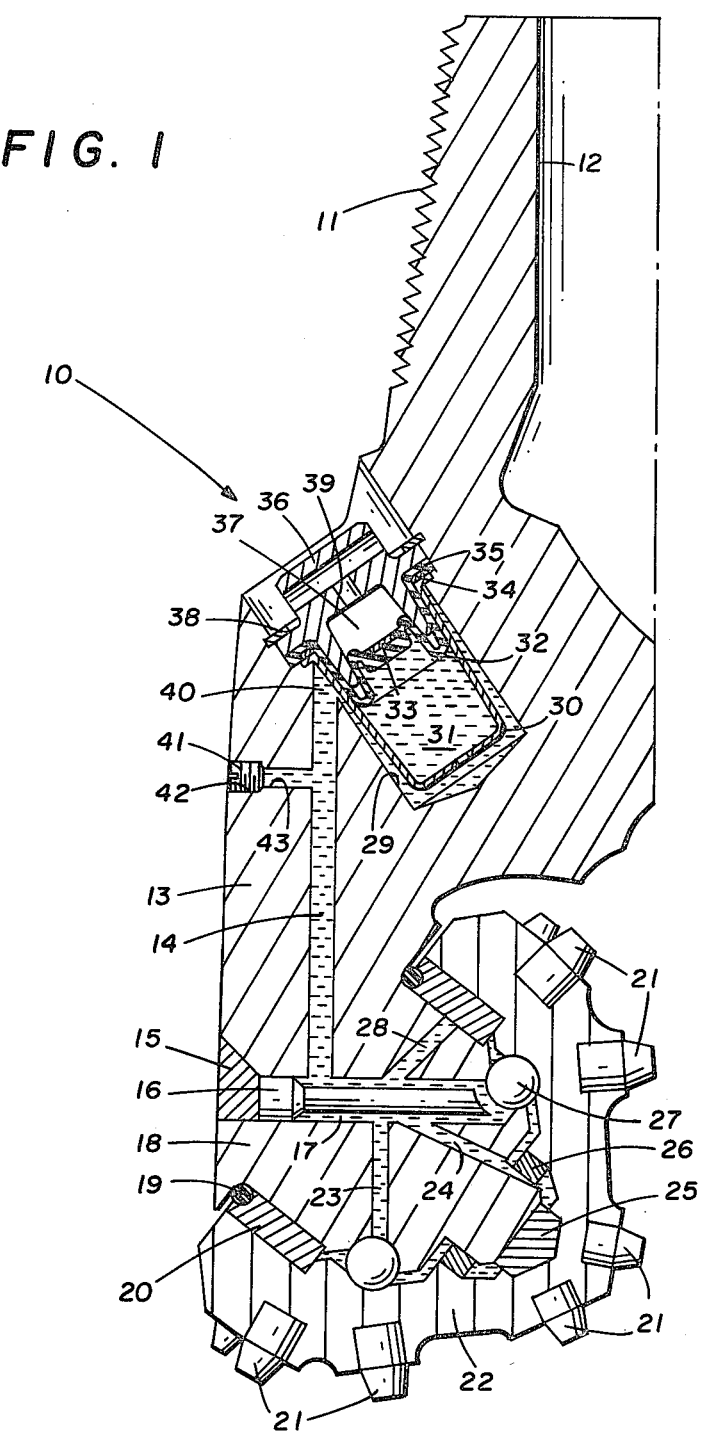
FIG. 1 is a sectional view of one arm of an earth boring bit illustrating an embodiment of a lubricant volume displacement system of the present invention.

Referring now to the drawings, and to FIG. 1 in particular, illustrated therein and generally designated by the reference number 10 is a three cone sealed bearing rotary rock bit with one arm 13 of the bit being shown in FIG. 1. As illustrated, the bit 10 includes a bit body including an upper threaded portion 11. The threaded portion 11 allows the bit 10 to be connected to the lower end of a rotary drill string (not shown). Depending from the bit body 11 are three substantially identical arms with the one arm 13 being shown in FIG. 1. The lower end of each of the arms is provided with an extended journal portion and the details of this journal portion will be discussed subsequently. Three rotary cone cutters, cutter 22 being shown in FIG. 1, are rotatably positioned on the individual bearing pins extending from the arms. Each of the cutters includes cutting structure on its outer surface adapted to disintegrate the formations as the bit 10 is rotated and moved downward. The cutting structure 21 is shown in the form of tungsten carbide inserts. However, it is to be understood that other cutting structures such as steel teeth may be used as the cutting structure on the cone cutters.

The cutter 22 is rotatably positioned on the journal portion of the arm 13 and adapted to disintegrate earth formations as the bit is rotated. The cutting structure 21 on the outer surface of cutter 22 contacts and disintegrates the formations in a manner that is well known in the art. The journal portion of arm 13 consists of a bearing pin 18 upon which the cutter 22 is mounted. A plurality of bearing systems are located in the bearing area between the cutter 22 and the bearing pin 18. The bearing systems in the bearing area include an outer friction bearing 20, a series of ball bearings 27, an inner friction bearing 26 and a thrust button 25. An O-ring seal 19 is positioned between the cutter 22 and the bearing pin 18. This seal retains lubricant in the bearing area around the bearing systems and prevents any materials in the well bore from entering the bearings. A passageway 17 is provided to allow lubricant to be transmitted to the bearing systems. The passageway 17, as shown, also allows the balls that make up the ball bearing system 27 to be inserted into position after the cone cutter 22 is placed on the bearing pin 18. The series of ball bearings 27 serve to lock the cone cutter 22 on bearing pin 18. After the balls are in place, a plug 16 is inserted into the passageway 17 and welded therein by weld 15. Plug 16 has a reduced diameter throughout the major portion of its length to allow lubricant to be transmitted to the bearing area. Additional passageways 23, 24 and 28 extend from passageway 17 to the bearing area to insure a sufficient supply of lubricant to bearings 20, 27, 26 and 25.

A lubricant reservoir cavity 29 is located in the arm 13. A source of lubricant is provided in the reservoir cavity to maintain a supply of lubricant to the bearings. A lubricant reservoir canister 30 is positioned in the reservoir cavity 29. A flexible diaphragm 32 is positioned in the lubricant reservoir canister 30 and encloses the lubricant reservoir canister thereby enclosing lubricant 31 within the canister 30. A reinforcement disk 33 is mounted in flexible diaphragm 33. An opening extends through the bottom of canister 30. The upper end of the lubricant reservoir cavity 29 is closed by a cap 36 locked in place in the arm 13 by a snap ring 38. An O-ring seal 35 is positioned beneath the cap 36 to seal the lubricant 31 in the lubricant reservoir and prevent contamination. A passageway 39 extends through the cap 36 to allow the pressure of fluid within the borehole to be transmitted to the flexible diaphragm 32. The passageway 39 is also used to displace lubricant 31 from the reservoir in a manner that will be explained subsequently. A passageway 14 connects the lubricant reservoir with the passageway 17 to allow lubricant to be transmitted from the reservoir directly to the bearings. The upper portion 40 of the passageway 14 is in open communication with the interior of the reservoir canister 30 to allow the lubricant to be transmitted to the bearings. A passageway 43 is connected to the passageway 14 to allow lubricant to be introduced into the lubricant reservoir. A plug 41 which engages threads 42 closes the passageway 43.

The bit 10 includes a central passageway 12 extending along the central axis of the bit 10 to allow drilling fluid to enter from the upper section of the drill string (not shown) immediately above and pass downward through three jet nozzles (not shown) past the cutting structure of the cone cutters. In use, the bit 10 is connected as the lower member of a rotary drill string (not shown) and lowered into a well bore until the cone cutters engage the bottom of the well bore. Upon engagement with the bottom of the well bore, the drill string is rotated, rotating bit 10 therewith. Drilling fluid is forced down through the interior passage of the rotary drill string and continues through the central passageway 12 of bit 10 passing through the nozzles past the cutting structure of the cutters to the bottom of the well bore, thence, upward in the annulus between the rotary drill string and the wall of the well bore carrying with it the cuttings and debris from the drilling operation.

When the bit 10 is lowered into the well bore, the environmental pressure surrounding the bit increases at the rate of approximately ½ pound per square inch for each foot of depth. This means that at a depth of 10,000 feet the hydrostatic pressure on the outside of the bit could be 5,000 p.s.i. or more because of the weight of the drilling fluid in the well bore above the bit. In order for a lubrication system to function properly at the elevated downhole pressures, some means must be provided to equalize the internal pressure of the lubricant in the lubrication system with the hydrostatic pressure of the drilling fluid in the well bore. Failure to provide an effective pressure equalizing system has resulted in the destruction of one or more elements of the lubrication system. The elements of the lubrication system that have been the most susceptible to destruction in the prior art are the cutter seal and the flexible diaphragm in the lubricant reservoir. In a substantial number of sealed bearing rotary rock bits, seals are used that resist flow in both directions. An example of this type of seal is an O-ring seal. Bits using this type of seal may encounter a substantial pressure build-up within the lubrication system. Some of the potential sources of the pressure build-up are the pressure differential between lubricant inside of the bit and the fluid in the well bore outside of the bit and thermal expansion of the lubricant caused by the elevated temperatures encountered during the drilling operation.

Figure 2:
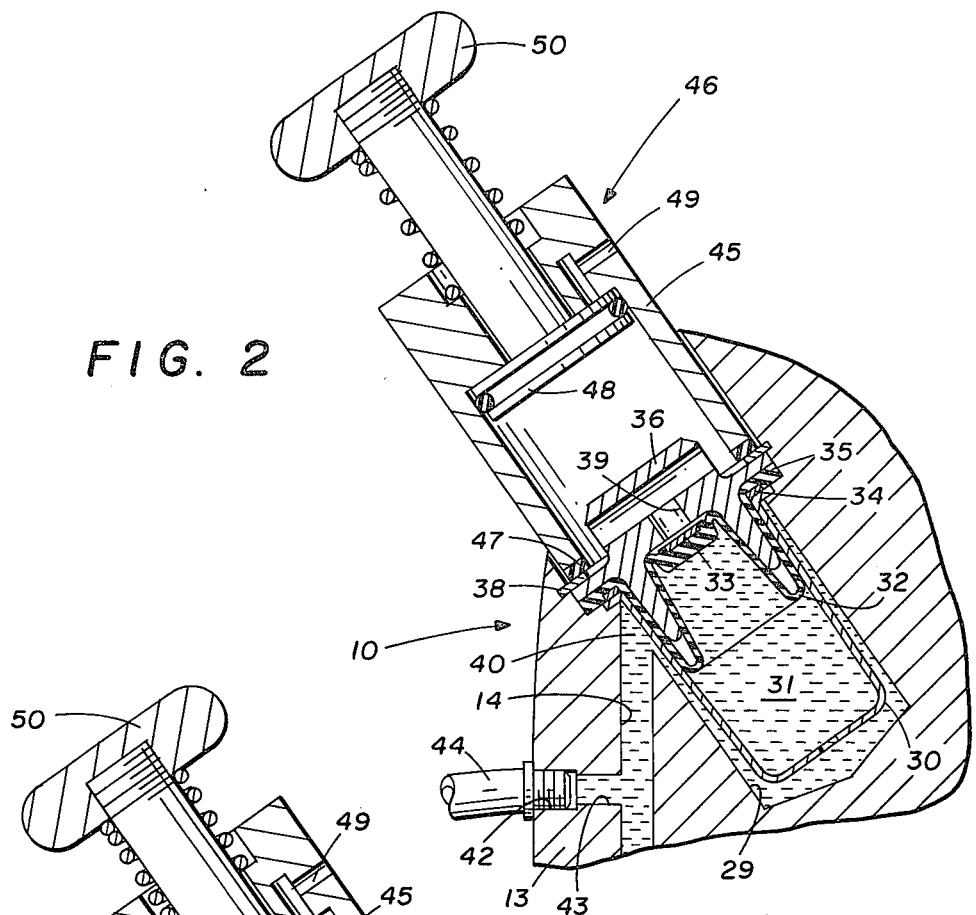
FIG. 2 is an enlarged view of the lubricant reservoir shown in FIG. 1 and apparatus for displacing a predetermined volume of lubricant within the lubricant reservoir.

Referring now to FIG. 2, an enlarged view of the lubricant reservoir area of the bit 10 is shown that illustrates the structural elements of the lubricant reservoir in greater detail and illustrates the lubricant volume displacement system of the present invention. The lubricant reservoir bore 29 extends into the arm 13 of the bit 10. The lower end of the bore 29 is closed. The lubricant passage 14 extends from the bore 29 to the bearing area. A flexible reservoir diaphragm 32 and a reservoir canister 30 are positioned in the bore 29. The diaphragm 32 is locked in place by the reservoir cap 36. A molded "O" ring type seal 35, being an axial seal and a radial seal, is compressed by the reservoir cap 36 to provide a positive seal between the flexible diaphragm 32 and the bore 29. The molded O-ring seal 35 is positioned between the reservoir cap 36 and a metal ring 34 to provide a positive seal for the lubricant reservoir canister 30. The reservoir cap 36 is locked in place by snap ring 38. A passageway 39 extends through the reservoir cap 36 and provides communication between fluid in the borehole and the flexible diaphragm 32.

The filling of the lubricant reservoir will now be described. A threaded filler passage 43 is provided in arm 13 to allow the lubricant reservoir to be filled with lubricant. The threaded filler passage 43 will be ultimately closed by a plug that mates with threads 42. A tube 44 is connected to the threaded filler passage 43. A vacuum is applied to the lubricant reservoir system to evacuate the entire lubrication system. Lubricant is then introduced through the tube 44 into the reservoir canister 30, the passages to the bearings and the bearing area. The pressure applied to the lubricant being introduced through tube 44 causes the flexible diaphragm 32 to be moved to a position wherein the lubricant 31 fills substantially the entire available area. The flexible diaphragm 32 is shown in the completely filled position in FIG. 2 prior to displacement of the lubricant in accordance with the present invention.

Figure 3:
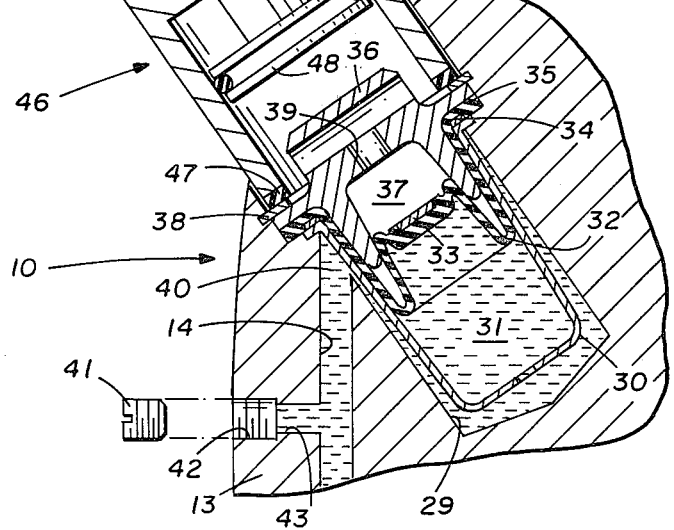
FIG. 3 is the enlarged view of FIG. 2 further illustrating the displacement of the lubricant and flexible diaphragm in the lubricant reservoir.

In order to provide an expansion area within the lubricant reservoir, the present invention provides a lubricant volume displacement system. With the lubricant reservoir completely filled with lubricant 31, the flexible diaphragm 32 could be damaged should internal pressures develop within the lubricant area. The present invention provides displacement of a predetermined volume of lubricant thereby providing an expansion space within the lubricant reservoir. A lubricant displacement apparatus 46 is positioned on top of the lubricant reservoir cap 36. The lubricant displacement apparatus 46 includes an open-ended cylinder 45. A seal element 47 extends along the bottom of the open-end cylinder 45. When the apparatus 46 is placed on top of the reservoir cap 36, the seal 47 provides a fluid-tight seal between the cylinder 45 and the reservoir cap 36. A movable piston 48 is located within the cylinder 45. A plunger 50 allows the movable piston 48 to be moved downward thereby forcing fluid contained within the cylinder 45 to be forced through the passage 39 in the reservoir cap 36. The passageway 49 provides a vent to the backside of the movable piston 48. By depressing plunger 50, the movable piston 48 is displaced downward forcing a predetermined volume of fluid within the cylinder 45 through the passage 39 in reservoir cap 36 thereby displacing an equal volume of lubricant 31 within the lubricant reservoir canister. This provides an expansion space within the lubricant reservoir. FIG. 3 shows the plunger 50 and piston 48 in a depressed position wherein a predetermined volume of lubricant 31 has been displaced from the lubricant reservoir.

The structural details of a lubricant volume displacement system for a rotary rock bit having been described the operation of the system will now be considered with particular reference to FIG. 3. The lubricant reservoir is substantially completely filled with lubricant. The lubricant displacement apparatus 46 is positioned on top of the lubricant reservoir cap 36. The plunger 50 and the movable piston 48 are moved downward thereby forcing fluid contained within the cylinder 45 through the passage 39 in the reservoir cap 36. A predetermined volume of fluid within the cylinder 45 is forced through the passage 39 in reservoir cap 36 thereby displacing an equal volume of lubricant 31 within the lubricant reservoir canister. The present invention provides displacement of a predetermined volume of lubricant thereby providing a precise expansion space within the lubricant reservoir. Once the predetermined volume of lubricant is displaced the plug 41 is threaded into the passage 42 to close the lubrication system, the lubricant displacement apparatus is removed and the bit 10 is ready for operation.

Figure 4:
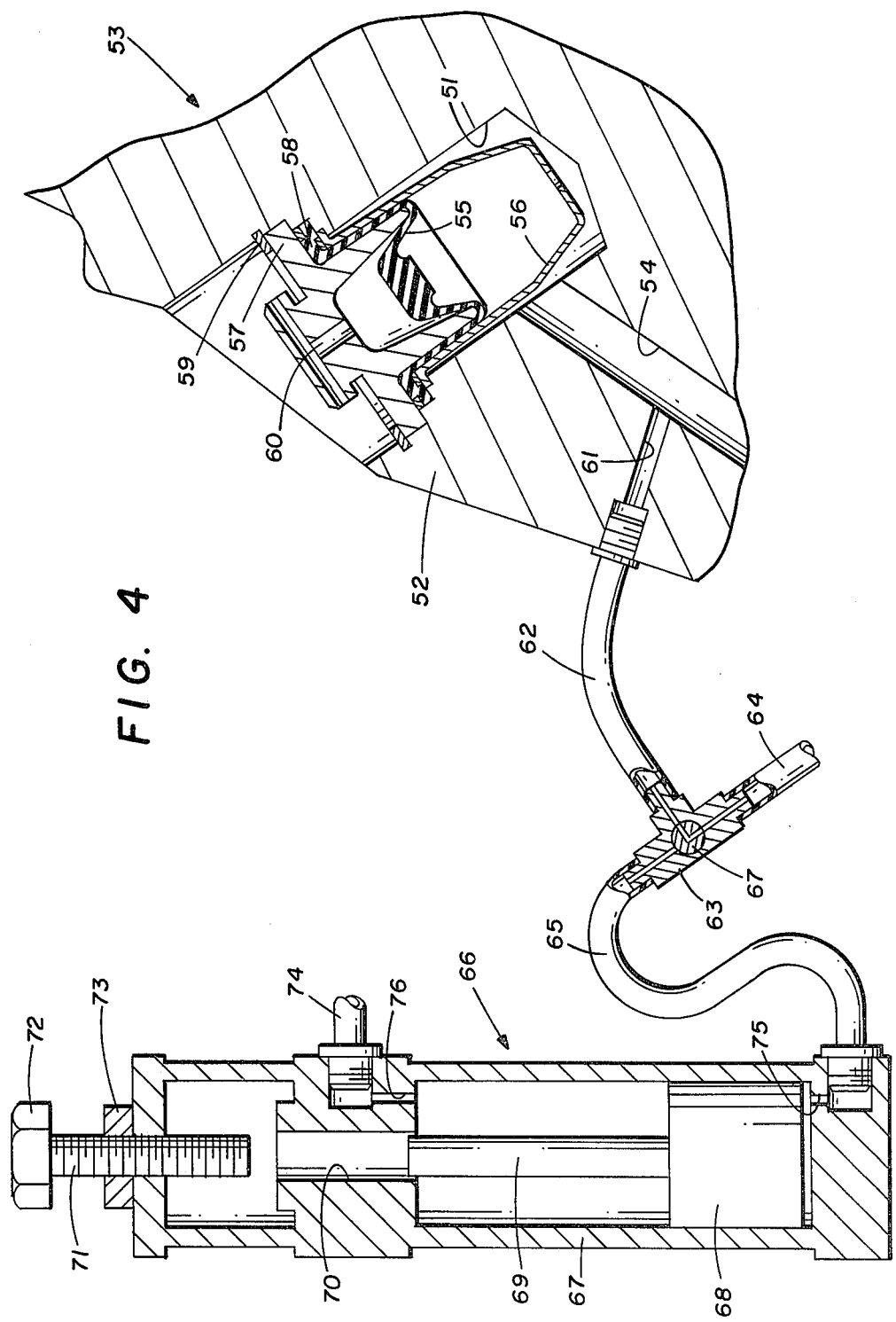
FIGS. 4 and 5 illustrate another embodiment of a lubricant volume displacement system of the present invention.
Figure 5:
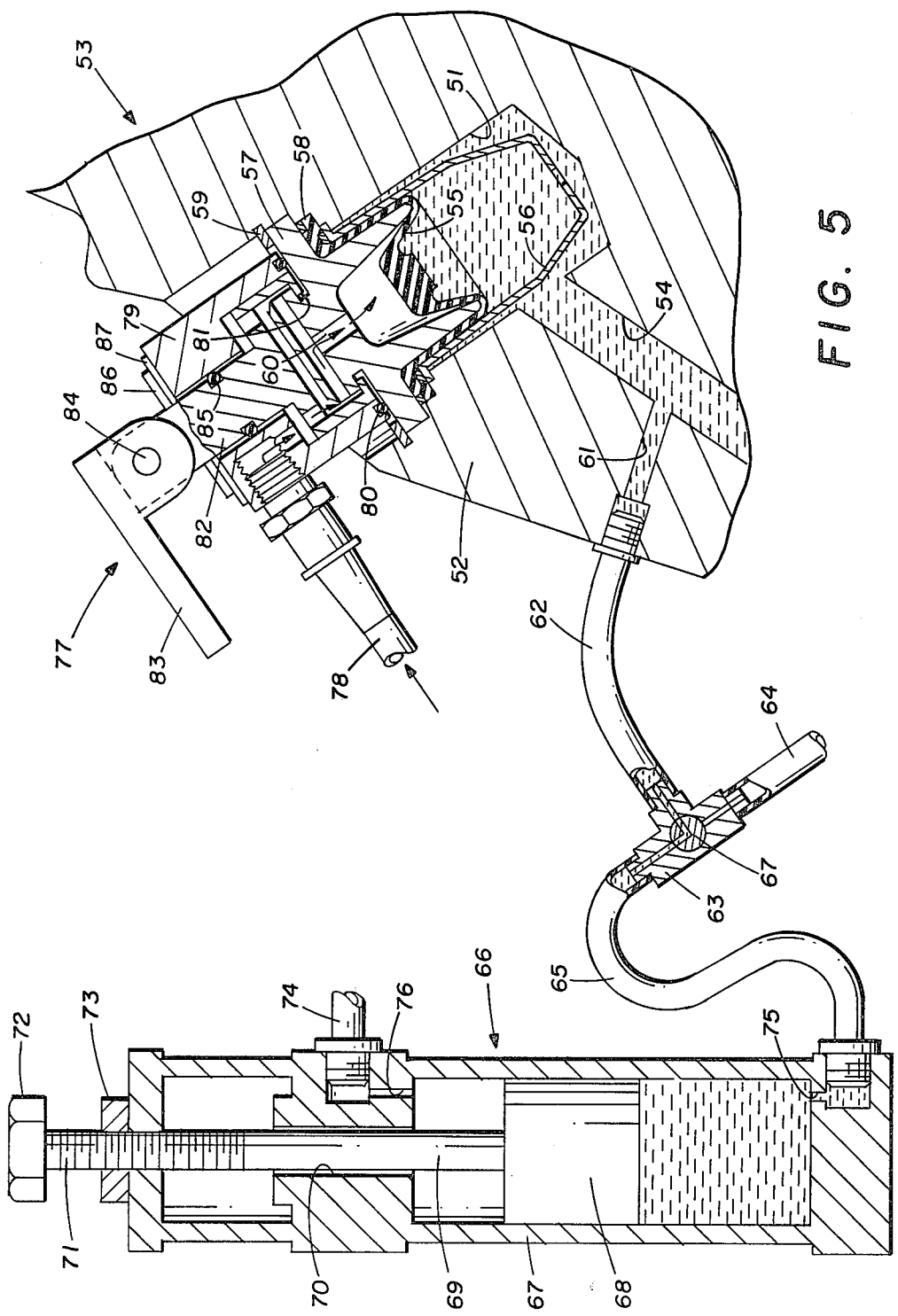

Referring now to FIGS. 4 and 5, a more elaborate embodiment of a lubricant volume displacement system of the present invention is illustrated. Although more elaborate, this embodiment of the present invention is considered the preferred embodiment because it is more customated and it provides better protection against contamination of the lubrication system.

A lubricant reservoir bore 51 extends into the arm 52 of a drill bit 53. The lower end of the bore 51 is closed. The lubricant passage 54 extends from the bore 51 to the bearing area. A flexible reservoir diaphragm 55 and a reservoir canister 56 are positioned in the bore 51. An opening through the reservoir canister allows lubricant to flow between the bore 51 and the canister 56. The diaphragm 55 is locked in place by the reservoir cap 57. A molded "O" ring type seal 58, being an axial seal and a radial seal, is compressed by the reservoir cap 57 to provide a positive seal between the flexible diaphragm 55 and the bore 51. The reservoir cap 57 is locked in place by snap ring 59. A passageway 60 extends through the reservoir cap 57 and provides communication between the outside of the bit and the flexible diaphragm 55.

A quick disconnect attachment device generally designated by the reference number 77 allows a source of air pressure to be quickly connected to and disconnected from the reservoir cap 57. The tube 78 extends from the air pressure source. The tube 78 is connected to the cylindrical attachment device housing 79. An O-ring seal 80 is located in the bottom of the cylindrical housing 79. An attachment member 82 extends through the cylindrical housing 79. An O-ring seal 85 provides a fluid type seal between the member 82 and the housing 79. The lower end of the attachment member 82 includes projections 81 that fit under the projecting upper portion of the reservoir cap 57. The projecting upper portion of the reservoir cap 57 is elongated and the opening between projections 81 is similarly elongated thereby allowing the quick disconnect device to be positioned over the reservoir cap 57, turned and locked thereon. The opening in housing 79 is positioned over the projecting upper portion of reservoir cap 57 and turned (rotated) so that the projections 81 move beneath the projecting upper portion of reservoir cap 57. This locks the quick disconnect device 77 onto the reservoir cap 57. An eccentric locking member 83 is connected to the upper portion of the member 82 by a pin 84. By rotation of the eccentric locking member 83, a force can be applied axially to housing 79 thereby compressing the O-ring seal 80 and providing a fluid tight seal between the housing 79 and reservoir cap 57. The eccentric locking member 83 bears against an annular steel washer 86 positioned about the upper portion of the member 82. A rubber washer 87 is positioned between the steel washer 86 and the top of housing 79. Air from tube 78 passes through the various passages, including passage 60 and moves the flexible diaphragm 55 to the desired position.

The threaded filler passage 61 is provided in arm 52 to allow the lubricant reservoir to be filled with lubricant. The threaded filler passage 61 will be ultimately closed by a plug. A tube 62 is connected to the threaded filler passage 61. A three part valve 63 is connected to the tube 62. Tubes 64 and 65 are connected to the three part valve 63. The valve member 67 in valve 63 allows selective channeling to the valve parts. Tube 64 is selectively connected to either a vacuum source or a lubricant supply. Tube 65 is connected to a measuring device 66.

The measuring device 66 comprises a movable piston 68 positioned in an elongated cylindrical housing 67. A piston rod 69 connected to the movable piston 68 extends into a passage 70 positioned in the upper portion of the housing 67. A passage 75 in the bottom of the housing 67 allows the tube 65 to be in communication with the area below movable piston 68. A threaded stop member 71 extends through the top of the housing 67. The handle 72 allows the stop member 71 to be rotated thereby moving the stop member 71 axially in the housing 67. A locknut 73 can be selectively positioned on the threaded stop member 71 to maintain the stop member 71 in the desired axial position. A passage 76 provides communication between a tube 74 and the upper side of the movable piston 68. A source of air pressure connected to tube 74 can be used to displace the movable piston 68 downward.

The filling of the lubricant reservoir will now be described with reference to FIG. 4. A vacuum is applied to the lubricant reservoir system through tube 64 to evacuate the entire lubrication system. Lubricant is then introduced through the tube 64 into the reservoir, the passages to the bearings and the bearing area. Pressure applied to the lubricant being introduced through tube 64 causes the flexible diaphragm 55 to be moved to a position wherein the lubricant fills substantially the entire available volume. The vacuum application and grease supply are transmitted by the proper shifting of valving to connect a vacuum source and grease supply to tube 64. After the vacuum application step, it is desirable to test for a time to see if the vacuum is held. This is primarily done to check for sealing of the diaphragm and of the seal in the bit. In case a vacuum leak does occur during the test, the operator knows that he has a faulty bit or must do some checking.

In order to provide an expansion area within the lubricant reservoir, the present invention provides lubricant volume displacement. This will be explained with reference to FIG. 5. With the lubricant reservoir completely filled with lubricant, the flexible diaphragm 55 could be damaged should internal pressures develop within the lubricant area. The present invention provides displacement of a predetermined volume of lubricant thereby providing an expansion space within the lubricant reservoir. This is accomplished in two steps. In the first step, air is admitted into the air adapter 77 on top of the reservoir cap 57 of the bit 53. The attachment member 82 extends through the cylindrical housing 79 of the air adapter 77. The lower end of the attachment member 82 includes projections 81 that fit under the projecting upper portion of the reservoir cap 57. The projecting upper portion of the reservoir cap 57 is elongated and the opening between projections 81 is similarly elongated thereby allowing the air adapter 77 to be positioned over the reservoir cap 57, turned and locked thereon. The opening in housing 79 is positioned over the projecting upper portion of reservoir cap 57 and turned (rotated) so that the projections 81 move beneath the projecting upper portion of reservoir cap 57. This locks the quick disconnect device 77 onto the reservoir cap 57. By rotation of the eccentric locking member 83, a force is applied axially to housing 79 thereby compressing the O-ring seal 80 and providing a fluid tight seal between the housing 79 and reservoir cap 57.

Air from tube 78 passes through the various passages, including passage 60 and moves the flexible diaphragm 55 to the desired position. This air works on the mud side of the diaphragm 55 and pushes a portion of the grease out through the tube 62. The valve 63 has been shifted so that the grease flows through tube 65 into the lower chamber of measuring device 66. The grease continues to fill the lower chamber of measuring device 66 causing the piston 68 to move upward until the piston rod 69 contacts the stop element 71. The predetermined volume of lubricant has been removed from the lubricant reservoir.

The second step of providing an expansion space in the lubricant reservoir comprises removal of the air pressure from the mud side of the flexible diaphragm 55. This is accomplished in a controlled manner. It has been found that because of the grease properties and action of the diaphragm that it was necessary to let the air bleed off the diaphragm 55 slowly to provide proper metering out.

The bit 53 is now fully greased and an expansion space metered out. The operator will disconnect the grease filling nozzle and install a pipe plug in the fill passage 61 of the bit. The machine stops at this point but does enable a purge cycle. The operator is then ready to purge the measuring device 66 to enable it to be ready for the next bit to go through the sequence. Air is admitted to the top of the metering zone through tube 74. The grease tube 62 is no longer connected to the bit 53, but is put over a bucket so that grease can go into from the tube 62 into the bucket. The air acts on top of piston 68 to push the grease out of the metering zone. When the metering zone is purged the valving 63 switches so that air is introduced into the lines 64 and 62 to purge them of grease.

We claim:

1. A method of providing an expansion space in the lubricant reservoir of a rotary rock bit, said rotary rock bit having a lubricant reservoir cavity, a flexible diaphragm in said lubricant reservoir cavity dividing the lubricant reservoir cavity into a lubricant portion on the lubricant portion side of said flexible diaphragm and pressure equalizing portion on the pressure equlizing portion side of said flexible diaphragm, a passage extending from said pressure equalizing portion of said lubricant reservoir cavity to the outside of said bit and a lubricant filling passageway connected with said lubricant portion of said lubricant reservoir cavity, comprising the steps of:

filling said lubricant portion of said lubricant reservoir cavity with lubricant by introducing said lubricant through said lubricant filling passageway into the lubricant portion on the lubricant portion side of said flexible diaphragm;

forcing a fluid through said passage into said pressure equalizing portion of said lubricant reservoir cavity on the pressure equalizing portion side of said flexible diaphragm to displace a predetermined volume of lubricant from said bit and provide an expansion space; and sealing said lubricant filling passageway.

2. A method of constructing a rotary rock bit, comprising the steps of:

providing a lubricant reservoir cavity in said bit;

positioning a flexible diaphragm in said lubricant reservoir cavity so that the flexible diaphragm divides the cavity into a lubricant portion and an expansion portion with said flexible diaphragm having an expansion portion side and a lubricant portion side;

providing a lubricant filling passageway connected to said lubricant portion of said lubricant reservoir cavity;

filling said lubricant portion of said lubricant reservoir cavity with a lubricant by introducing lubricant through said lubricant filling passageway into said lubricant portion on said lubricant portion side of said flexible diaphragm so that said flexible diaphragm is moved into said expansion portion;

forcing a fluid into said lubricant reservoir cavity into said expansion portion on said expansion portion side of said flexible diaphragm forcing said flexible diaphragm to withdraw from said expansion portion to expel a predetermined volume of lubricant from said bit; and sealing said lubricant filling passageway.

3. A method of constructing a rotary rock bit, comprising the steps of:

providing a lubricant reservoir cavity in said bit;

positioning a flexible diaphragm in said lubricant reservoir cavity so that the flexible diaphragm divides the cavity into a lubricant portion and an expansion portion with said flexible diaphragm having an expansion portion side and a lubricant portion side;

providing a lubricant filling passageway connected to said lubricant portion of said lubricant reservoir cavity;

filling said lubricant portion of said lubricant reservoir cavity wth a lubricant by introducing lubricant through said lubricant filling passageway into said lubricant portion on said lubricant portion side of said flexible diaphragm and continuing filling so that said flexible diaphragm is moved into said expansion portion and said expansion portion is filled with lubricant;

forcing air into said lubricant reservoir cavity expansion portion on said expansion portion side of said flexible diaphragm forcing said flexible diaphragm to withdraw from said expansion portion forcing a predetermined volume of lubricant out of said expansion portion; and sealing said lubricant filling passageway.

4. A method of constructing a rotary rock bit having a lubricant reservoir cavity, a flexible diaphragm with a lubricant portion side and an expansion side in said lubricant reservoir cavity and a lubricant filling passageway for introducing lubricant into said lubricant reservoir, said lubricant being on the lubricant portion side of said flexible diaphragm and with an expansion passage being on the expansion side of said flexible diaphragm, comprising the steps of:

substantially filling said lubricant reservoir cavity with lubricant by introducing said lubricant through said lubricant filling passageway into the lubricant portion side of said flexible diaphragm thereby moving said flexible diaphragm to a substantially completely filled position;

forcing air into said lubricant reservoir cavity on the expansion side of said flexible diaphragm and displacing a predetermined volume of lubricant from said lubricant reservoir cavity thereby moving said flexible diaphragm to a partially filled position and providng an expansion space in said lubricant reservoir cavity; and sealing said lubricant filling passageway.

5. A method of constructing a rotary rock bit, comprising the steps of:

providing a lubricant reservoir bore in said bit, said bore having a closed end and an open end;

providing a cap to close said open end of said lubricant reservoir bore, said cap having a passage therethrough;

positioning a flexible diaphragm in said lubricant reservoir bore between said cap and said closed end of said lubricant reservoir bore so that the flexible diaphragm divides the bore into a lubricant portion between said closed end of said lubricant reservoir bore and said flexible diaphragm and an expansion portion between said cap and said flexible diaphragm;

providing a filling passageway through said bit connected to said lubricant reservoir bore;

filling said lubricant portion of said lubricant reservoir cavity with a lubricant by introducing said lubricant through said filling passageway into said lubricant reservoir bore between said closed end of said lubricant reservoir bore and said flexible diaphragm so that said flexible diaphragm is moved into said expansion portion;

forcing air through said passage in said cap into the expansion portion between said cap and said flexible diaphragm causing said flexible diaphragm to retreat from said expansion portion and expel a predetermined volume of lubricant from said bit through said filling passageway; and closing said filling passage to seal said bit.

* * * * *